United States Patent
Lin et al.

(10) Patent No.: US 8,530,566 B2
(45) Date of Patent: Sep. 10, 2013

(54) ELECTRICALLY INSULATING AND THERMALLY CONDUCTIVE COMPOSITION AND ELECTRONIC DEVICE

(75) Inventors: Chen-Lung Lin, Taichung County (TW); Meng-Ju Wu, Hsinchu County (TW); Kuo-Chan Chiou, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/191,113

(22) Filed: Jul. 26, 2011

(65) Prior Publication Data

US 2012/0229981 A1 Sep. 13, 2012

(30) Foreign Application Priority Data

Mar. 9, 2011 (TW) ............... 100107855 A

(51) Int. Cl.
*C08K 3/04* (2006.01)
(52) U.S. Cl.
USPC .......................................... 524/496; 524/495
(58) Field of Classification Search
USPC ................................. 524/495, 496
See application file for complete search history.

(56) References Cited

U.S. PATENT DOCUMENTS

| | | | |
|---|---|---|---|
| 6,783,692 B2 | 8/2004 | Bhagwagar | |
| 6,887,942 B2 | 5/2005 | Chien et al. | |
| 7,923,491 B2 * | 4/2011 | Weng et al. | ............... 524/13 |
| 2009/0093581 A1 * | 4/2009 | Swei et al. | ............... 524/496 |
| 2010/0036023 A1 | 2/2010 | Weng et al. | |
| 2010/0096597 A1 | 4/2010 | Prud'Homme et al. | |

FOREIGN PATENT DOCUMENTS

| | | |
|---|---|---|
| CN | 101048055 | 10/2007 |
| JP | 2004123867 | 4/2004 |
| JP | 2006108377 | 4/2006 |
| JP | 2009132810 | 6/2009 |
| JP | 2010-100837 | 5/2010 |
| JP | 2011017111 | 1/2011 |
| JP | 2011184681 | 9/2011 |
| TW | 201017692 | 5/2010 |
| WO | WO2008143692 | 11/2008 |

OTHER PUBLICATIONS

Aiping Yu et al., "Graphite Nanoplatelet-Epoxy Composite Thermal Interface Materials", *Journal of Physical Chemistry C*, 2007 pp. 7565-7569.
W.H. Hung, "The thinnest material in the world-graphene" KagSi Chemistry Newspaper, Nov. 2009, pp. 1-4.

* cited by examiner

*Primary Examiner* — Peter Szekely
(74) *Attorney, Agent, or Firm* — Muncy, Geissler, Olds & Lowe, PLLC

(57) ABSTRACT

An embodiment of the invention provides an electrically insulating and thermally conductive composition including 5-80 parts by weight of a resin, 20-95 parts by weight of an electrically insulating and thermally conductive powder, and 0.0001-2 parts by weight of a graphene. Another embodiment of the invention also provides an electronic device including the electrically insulating and thermally conductive composition.

7 Claims, 1 Drawing Sheet

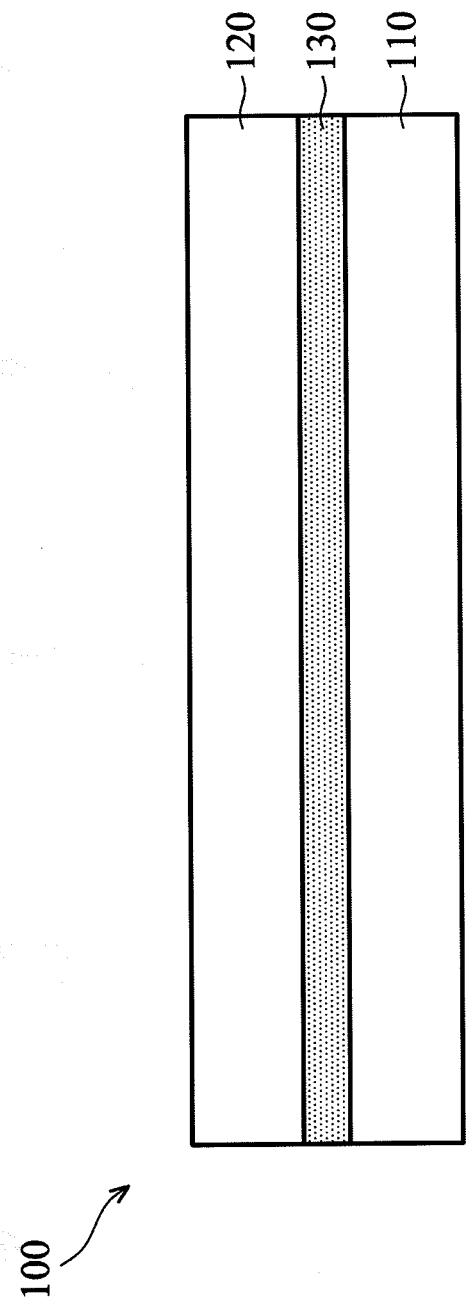

ELECTRICALLY INSULATING AND THERMALLY CONDUCTIVE COMPOSITION AND ELECTRONIC DEVICE

CROSS REFERENCE TO RELATED APPLICATIONS

This application claims priority of Taiwan Patent Application No. 100107855, filed on Mar. 9, 2011, the entirety of which is incorporated by reference herein.

BACKGROUND OF THE INVENTION

1. Field of the Invention

The present invention relates to a thermally conductive material, and in particular relates to an electrically insulating and thermally conductive composition and applications thereof.

2. Description of the Related Art

In recent years, with progress of technologies and information, manufacturing technologies of electronic products have improved. In addition to demand for electronic products to be light, thin, short and small, good properties thereof are also required.

Take a computer as an example, dimensions of integrated circuits in computers have gradually reduced with progress of semiconductor technologies. A continuing trend in modern integrated circuits is to increase the number of electronic devices per unit area to process more data. However, when the number of electronic devices of the integrated circuits increases, the heat generated by the electronic devices during operation increases as well.

Take a central processing unit (CPU) on a motherboard of a computer as an example, if the CPU is at full load, the heat generated by the CPU is enough to burn out the CPU. Accordingly, if waste heat generated by electronic devices during operation can't be effectively removed, the temperature of the electronic devices rises, which decreases the performance of the electronic devices or even damages the electronic devices.

Therefore, the electronic devices are typically connected to heat dissipating devices to transfer the heat produced by the electronic devices to the heat dissipating device, and then the heat is dissipated by thermal convection, or thermal radiation, etc. However, surfaces of the electronic devices and the heat dissipating device are both not flat and smooth surfaces, and accordingly the electronic devices and the heat dissipating device cannot be compactly attached with each other, thus, providing a gap therebetween. Because the thermal conductive property of air is poor, the gap between the electronic devices and the heat dissipating device significantly decreases thermal conductive efficiency.

BRIEF SUMMARY OF THE INVENTION

An embodiment of the invention provides an electrically insulating and thermally conductive composition which includes: 5-80 parts by weight of a resin; 20-95 parts by weight of an electrically insulating and thermally conductive powder; and 0.0001-2 parts by weight of a graphene.

An embodiment of the invention provides an electronic device, which includes: a heat producing element; a heat dissipating element; and an electrically insulating and thermally conductive layer disposed between the heat producing element and the heat dissipating element, wherein the electrically insulating and thermally conductive layer comprises: 5-80 parts by weight of a resin; 20-95 parts by weight of an electrically insulating and thermally conductive powder; and 0.0001-2 parts by weight of a graphene.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 1 is a schematic diagram of an electronic device in accordance with an embodiment of the present invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

It is understood, that the following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numbers and/or letters in the various examples. This repetition is for the purpose of simplicity and clarity and does not in itself dictate a relationship between the various embodiments and/or configurations discussed. Furthermore, descriptions of a first layer "on," "overlying," (and like descriptions) a second layer, include embodiments where the first and second layers are in direct contact and those where one or more layers are interposing the first and second layers.

An electrically insulating and thermally conductive composition of the present invention includes a graphene, a resin and an electrically insulating and thermally conductive powder, wherein the graphene has a superior thermal conductive property to increase a thermal conductivity of the electrically insulating and thermally conductive composition without compromising the insulating property thereof. Also, compared with conventional electrically insulating and thermally conductive compositions, the electrically insulating and thermally conductive composition of the present invention requires less electrically insulating and thermally conductive powder to reach the same thermal conductivity, such that the composition of the present invention has lower viscosity and better formability.

An electrically insulating and thermally conductive composition of the present embodiment includes 5-80 parts by weight of a resin, 20-95 parts by weight of an electrically insulating and thermally conductive powder, and 0.0001-2 parts by weight of a graphene. In one embodiment, the electrically insulating and thermally conductive composition includes 0.01-1 parts by weight of the graphene, wherein a thickness of the graphene is, for example, ranging from about 0.2 nanometers to 50 nanometers, and a length (or a width) of the graphene ranges from nanometers to micrometers. In the present embodiment, a volume resistivity of the electrically insulating and thermally conductive composition is greater than $10^{12}$ ohm-centimeters.

It should be noted that the graphene is a two-dimensional structure, so the thermal conductivity of the graphene is very high. In the present embodiment, by adding a small amount of the graphene, most of the heat can be transmitted in the electrically insulating and thermally conductive powder and the graphene (which are both better thermal conductors) so as to shorten the thermally conducting path in the resin, and accordingly the thermal conductivity of the electrically insulating and thermally conductive composition is significantly increased. However, if the additional amount of the graphene is too much, the insulating property of the electrically insulating and thermally conductive composition decreases, and the electrically insulating and thermally conductive composition becomes a semiconductor or even a conductor. Therefore, the additional amount of the graphene should be within a proper range, for example the above-described amount, but not limited thereto. In a preferred embodiment, the graphene is added in an amount such that a volume resistivity of the electrically insulating and thermally conductive composition is greater than $10^{12}$ ohm-centimeters.

The electrically insulating and thermally conductive powder can increase the thermal conductivity of the electrically insulating and thermally conductive composition, wherein the electrically insulating and thermally conductive powder is, for example, metal oxide, ceramic materials, diamond, charcoal, or combinations thereof. Specifically, the electrically insulating and thermally conductive powder includes boron nitride, aluminum oxide, aluminum nitride, magnesium nitride, zinc oxide, silicon carbide, beryllium oxide, diamond, tungsten carbide, or combinations thereof. For example, the electrically insulating and thermally conductive powder of the present embodiment may include two kinds of powders with different grain sizes and/or different compositions so as to raise a packing ratio and a thermal conductivity of the electrically insulating and thermally conductive composition, while maintaining the insulating property of the electrically insulating and thermally conductive composition at an acceptable level.

The resin provides the electrically insulating and thermally conductive composition with various properties to meet requirements of different applications, such as insulating property, mechanical strength, flexibility, pliability, or adhesive property, etc. The resin is, for example, an organic resin, an inorganic resin, or combinations thereof. Specifically, the resin includes epoxy resins, siloxane resins, polyimide resins, polyurethane resins, ethylene-vinyl acetate resins, acrylic resins, elastomer, rubber, or combinations thereof.

The graphene used herein may be a chemically modified or physically modified graphene including a graphene grafted with organic molecules and inorganic molecules, or a graphene adsorbed with organic molecules and inorganic molecules.

The electrically insulating and thermally conductive composition of the present invention may further include various additives which are well known in the art so as to reinforce physical and/or chemical properties of the electrically insulating and thermally conductive composition. However, if the additional amount of the additive is too much, formability or viscosity of the electrically insulating and thermally conductive composition is adversely affected, which results in processing difficulties and a decrease of the thermal conductivity. Therefore, a weight of the additive of the present embodiment is preferably less than one fifth of a weight of the resin. For example, when the weight of the resin is 80 parts by weight, the weight of the additive is preferably less than 16 parts by weight. The additive may include a curing agent, a catalyst, an antifoaming agent, an inhibiting agent, an antioxidant, a flame retardant, a leveling agent, a mold releasing agent, or combinations thereof, wherein the catalyst and the inhibiting agent are used to modulate the reaction rate and level of a curing of the resin.

An embodiment of an electronic device with an electrically insulating and thermally conductive layer using the above-described electrically insulating and thermally conductive composition will be described in detail in the following description.

FIG. 1 is a schematic diagram of an electronic device in accordance with an embodiment of the present invention. Referring to FIG. 1, an electronic device 100 of the present embodiment includes a heat producing element 110, a heat dissipating element 120, and an electrically insulating and thermally conductive layer 130. The electrically insulating and thermally conductive layer 130 is disposed between the heat producing element 110 and the heat dissipating element 120, and the electrically insulating and thermally conductive layer 130 includes the electrically insulating and thermally conductive composition with the graphene of the present invention. Specifically, the electrically insulating and thermally conductive layer 130 includes 5-80 parts by weight of a resin, 20-95 parts by weight of an electrically insulating and thermally conductive powder, and 0.0001-2 parts by weight of a graphene.

The heat producing element 110 is, for example, an electronic product used in the consumer 3C (ie. Computer, Communication, Consumer Electronic), industry, cars, medical care, aerospace engineering, or communication, etc. The electronic product is, for example, a motherboard, a central processing unit, a chip, or display, etc, or other heat producing devices, such as a light emitting diode lamp, a metal wiring, a heat engine, a cooling engine, or an engine.

The heat dissipating element 120 on the heat producing element 110 serves to quickly remove accumulated heat produced by the heat producing element 110 during operation to avoid performance degradation and failure of the heat producing element 110. The heat dissipating element 120 is, for example, a heat sink, a fan, a metal sheet, a plurality of metal fins, a heat pipe, combinations thereof, or other suitable heat dissipating elements.

The electrically insulating and thermally conductive layer 130 disposed between the heat producing element 110 and the heat dissipating element 120 may compactly attach the heat producing element 110 and the heat dissipating element 120 by filling the gap therebetween, thereby effectively improving the thermal conduction therebetween. The electrically insulating and thermally conductive layer 130 may be used as an electric isolating layer between the heat producing element 110 and the heat dissipating element 120.

Examples and comparative examples of the electrically insulating and thermally conductive composition are described as follows.

The thermal conductivities are measured by the Hot disk Standard Method of ISO22007, and viscosities are measured by using a TA AR-G2 RHEOMETER. The physical properties, such as thermal conductivities, resistivities, and viscosities, are listed in Table 1.

The examples and the comparative examples described below used the same kind of epoxy resin (EPON828 from Shell, the chemical formula thereof is represented as formula 1 below) and amine curing agent (D2000 from Huntsman, the chemical formula thereof is represented as formula 2 below).

The chemical formula of EPON828 is represented as formula 1, wherein n is about 1~2:

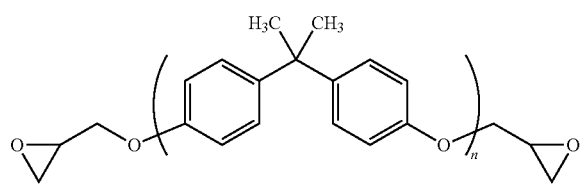

Formula 1

The chemical formula of D2000 is represented as formula 2, wherein x is about 33:

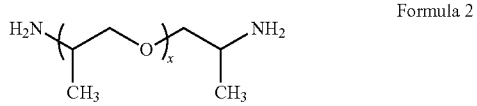

Formula 2

Example 1

9 grams of an epoxy resin and 24 grams of an amine curing agent were placed in a reactor (250 ml) and thoroughly mixed by high speed stirring, followed by addition of 187 grams of an aluminum oxide powder to form a mixture. The mixture was stirred at high speed for 5 minutes, and then 50 milligrams of a graphene (thickness; 2~3 nanometers) was added to the mixture and thoroughly mixed by high speed stirring. Then, the mixture was dispersed by a roller for three times, and then placed in an oven at 150° C. for 2 hours for curing, thereby forming an electrically insulating and thermally conductive composition with high thermal conductivity. A solid content of powders of the electrically insulating and thermally conductive composition was about 85 wt %. As shown in Table 1, the thermal conductivity of the electrically insulating and thermally conductive composition was 3.2 W/mK.

Example 2

9 grams of an epoxy resin and 24 grams of an amine curing agent were placed in a reactor (250 ml) and thoroughly mixed by high speed stirring, followed by addition of 187 grams of a boron nitride powder to form a mixture. The mixture was stirred at high speed for 5 minutes, and then 50 milligrams of a graphene (thickness; 2~3 nanometers) was added to the mixture and thoroughly mixed by high speed stirring. Then, the mixture was dispersed by a roller for three times, and then placed in an oven at 150° C. for 2 hours for curing, thereby forming an electrically insulating and thermally conductive composition with high thermal conductivity. A solid content of powders of the electrically insulating and thermally conductive composition was about 85 wt %. As shown in Table 1, the thermal conductivity of the electrically insulating and thermally conductive composition was 3.7 W/mK.

Comparative Example 1

9 grams of an epoxy resin and 24 grams of an amine curing agent were placed in a reactor (250 ml) and thoroughly mixed by high speed stirring, followed by addition of 187 grams of an aluminum oxide powder to form a mixture. The mixture was stirred at high speed for 5 minutes. Then, the mixture was dispersed by a roller for three times, and then placed in an oven at 150° C. for 2 hours for curing, thereby forming an electrically insulating and thermally conductive composition. A solid content of powders of the electrically insulating and thermally conductive composition was about 85 wt %.

As shown in Table 1, the thermal conductivity of the electrically insulating and thermally conductive composition of the comparative example 1 was 2 W/mK. By comparing the example 1 and the comparative example 1, even a small amount of the graphene (about 0.05 wt %) can significantly increase the thermal conductivity while maintaining the resistivity of the electrically insulating and thermally conductive composition.

Comparative Example 2

9 grams of an epoxy resin and 24 grams of an amine curing agent were placed in a reactor (250 ml) and thoroughly mixed by high speed stirring, followed by addition of 187 grams of a boron nitride powder to form a mixture. The mixture was stirred at high speed for 5 minutes. Then, the mixture was dispersed by a roller for three times, and then placed in an oven at 150° C. for 2 hours for curing, thereby forming an electrically insulating and thermally conductive composition. A solid content of powders of the electrically insulating and thermally conductive composition was about 85 wt %.

As shown in Table 1, the thermal conductivity of the electrically insulating and thermally conductive composition of the comparative example 2 was 2.6 W/mK. By comparing the example 2 and the comparative example 2, even a small amount of the graphene (about 0.05 wt %) can significantly increase the thermal conductivity while maintaining the resistivity of the electrically insulating and thermally conductive composition.

Comparative Example 3

9 grams of an epoxy resin and 24 grams of an amine curing agent were placed in a reactor (250 ml) and thoroughly mixed by high speed stirring, followed by addition of 297 grams of an aluminum oxide powder to form a mixture. The mixture was thoroughly mixed by high speed stirring. Then, the mixture was dispersed by a roller for three times, and then placed in an oven at 150° C. for 2 hours for curing, thereby forming an electrically insulating and thermally conductive composition. A solid content of powders of the electrically insulating and thermally conductive composition was about 90 wt %.

As shown in Table 1, the thermal conductivity of the electrically insulating and thermally conductive composition of the comparative example 3 was 3.3 W/mK. However, a viscosity of the electrically insulating and thermally conductive composition was as high as about 3 million centi-Poises (cP), so it was difficult to further process the composition.

Comparative Example 4

9 grams of an epoxy resin and 24 grams of an amine curing agent were placed in a reactor (250 ml) and thoroughly mixed by high speed stirring, followed by addition of 50 milligrams of graphite. Then, 187 grams of an aluminum oxide powder was added in the reactor to form a mixture. The mixture was thoroughly mixed by high speed stirring. Then, the mixture was dispersed by a roller for three times, and then placed in an oven at 150° C. for 2 hours for curing, thereby forming an electrically insulating and thermally conductive composition. A solid content of powders of the electrically insulating and thermally conductive composition was about 85 wt %.

As shown in Table 1, the thermal conductivity of the electrically insulating and thermally conductive composition of the comparative example 4 was 2.1 W/mK, indicating that the addition of 50 milligrams of graphite (0.05 wt %) did not increase the thermal conductivity of the electrically insulating and thermally conductive composition.

Comparative Example 5

9 grams of an epoxy resin and 24 grams of an amine curing agent were placed in a reactor (250 ml) and thoroughly mixed by high speed stirring, followed by addition of 4.8 grams of graphite. Then, 183 grams of an aluminum oxide powder was added in the reactor to form a mixture. The mixture was thoroughly mixed by high speed stirring. Then, the mixture was dispersed by a roller for three times, and then placed in an oven at 150° C. for 2 hours for curing, thereby forming an electrically insulating and thermally conductive composition. A solid content of powders of the electrically insulating and thermally conductive composition was about 85 wt %.

As shown in Table 1, the thermal conductivity of the electrically insulating and thermally conductive composition of the comparative example 5 was 4.2 W/mK. It can be known that an additional amount of 4.8 grams of graphite (2.2 wt %) can increase the thermal conductivity of the electrically insulating and thermally conductive composition, but the volume resistivity of the electrically insulating and thermally conductive composition was significantly decreased ($1.5 \times 10^{10}$ Ω-cm), and therefore, the electrically insulating and thermally conductive composition was not sufficiently insulating.

In view of the foregoing, in the present invention, a small amount of a graphene with good thermal conductive property is added in the electrically insulating and thermally conductive composition so as to effectively improve a thermal conductive property of the electrically insulating and thermally conductive composition while maintaining an insulating property of the electrically insulating and thermally conductive composition at an acceptable level. Also, the addition of the graphene decreased the amount of an electrically insulating and thermally conductive powder of the electrically insulating and thermally conductive composition and maintained the thermal conductivity, and accordingly the electrically insulating and thermally conductive composition of the present invention had low viscosity and good formability. Furthermore, the electrically insulating and thermally conductive composition of the present invention was disposed between the heat producing element and the heat dissipating element so as to compactly attach the heat producing element and the heat dissipating element together, and accordingly effectively improve the thermal conduction therebetween.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electrically insulating and thermally conductive composition, comprising:
    5-80 parts by weight of a resin comprising an epoxy resin, a siloxane resin, a polyurethane resin, an ethylene-vinyl acetate resin, an acrylic resin, a rubber, or combinations thereof;
    20-95 parts by weight of an electrically insulating and thermally conductive powder; and
    0.0001-2 parts by weight of a graphene, wherein the graphene comprises a modified graphene comprising a graphene grafted with organic molecules and inorganic molecules, or a graphene adsorbed with organic molecules and inorganic molecules.

TABLE 1

|  | Example 1 | Example 2 | Comparative example 1 | Comparative example 2 | Comparative example 3 | Comparative example 4 | Comparative example 5 |
|---|---|---|---|---|---|---|---|
| Epoxy resin | EPON828 | EPON828 | EPON828 | EPON828 | EPON828 | EPON828 | EPON828 |
| Amine curing agent | D2000 | D2000 | D2000 | D2000 | D2000 | D2000 | D2000 |
| Thermally conductive powder | $Al_2O_3$ 85 wt % | BN 85 wt % | $Al_2O_3$ 85 wt % | BN 85 wt % | $Al_2O_3$ 90 wt % | $Al_2O_3$ 85 wt % | $Al_2O_3$ 85 wt % |
| Small additional amount of powder | graphene 0.05 wt % | graphene 0.05 wt % | none | none | none | graphite 0.05 wt % | graphite 2.2 wt % |
| Thermal conductivity (W/mK) | 3.2 | 3.7 | 2 | 2.6 | 3.3 | 2.1 | 4.2 |
| volume resistivity (Ω-cm) | $3.5 \times 10^{14}$ | $5 \times 10^{14}$ | $2.5 \times 10^{14}$ | $5.1 \times 10^{14}$ | $2.2 \times 10^{14}$ | $2.1 \times 10^{14}$ | $1.5 \times 10^{10}$ |
| viscosity (cP) (shear rate 10 1/s) | $2 \times 10^5$ | $1.2 \times 10^5$ | $2 \times 10^5$ | $1.1 \times 10^5$ | $3 \times 10^6$ | $2 \times 10^5$ | $5 \times 10^5$ |

2. The electrically insulating and thermally conductive composition as claimed in claim 1, wherein a thickness of the graphene ranges from 0.2 nanometers to 50 nanometers.

3. The electrically insulating and thermally conductive composition as claimed in claim 1, wherein the electrically insulating and thermally conductive powder comprises metal oxide, ceramic materials, diamond, charcoal, or combinations thereof.

4. The electrically insulating and thermally conductive composition as claimed in claim 1, wherein the electrically insulating and thermally conductive powder comprises boron nitride, aluminum oxide, aluminum nitride, magnesium nitride, zinc oxide, silicon carbide, beryllium oxide, diamond, tungsten carbide, or combinations thereof.

5. The electrically insulating and thermally conductive composition as claimed in claim 1, wherein the electrically insulating and thermally conductive composition comprises 0.01-1 parts by weight of the graphene.

6. The electrically insulating and thermally conductive composition as claimed in claim 1, wherein a volume resistivity of the electrically insulating and thermally conductive composition is greater than $10^{12}$ ohm-centimeters.

7. The electrically insulating and thermally conductive composition as claimed in claim 1, further comprising:
   an additive comprising a curing agent, a catalyst, an antifoaming agent, an inhibiting agent, an antioxidant, a flame retardant, a leveling agent, a mold releasing agent, or combinations thereof.

* * * * *